Sept. 29, 1936.  S. LEVINSTIM  2,055,902
HOISTING APPARATUS
Filed Sept. 19, 1935  7 Sheets-Sheet 1

INVENTOR
SIDNEY LEVINSTIM

BY Van Deventer + Grier
ATTORNEYS

Sept. 29, 1936.　　　　S. LEVINSTIM　　　　2,055,902
HOISTING APPARATUS
Filed Sept. 19, 1935　　　7 Sheets-Sheet 3

INVENTOR
SIDNEY LEVINSTIM
BY Van Deventer + Grier
ATTORNEYS

Sept. 29, 1936.  S. LEVINSTIM  2,055,902
HOISTING APPARATUS
Filed Sept. 19, 1935    7 Sheets-Sheet 4
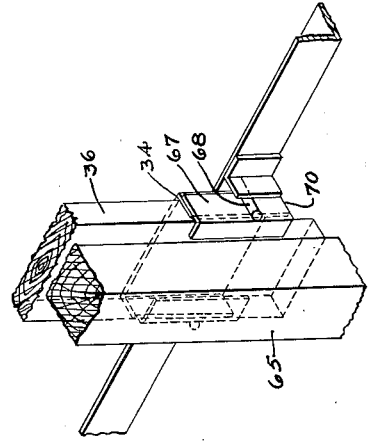
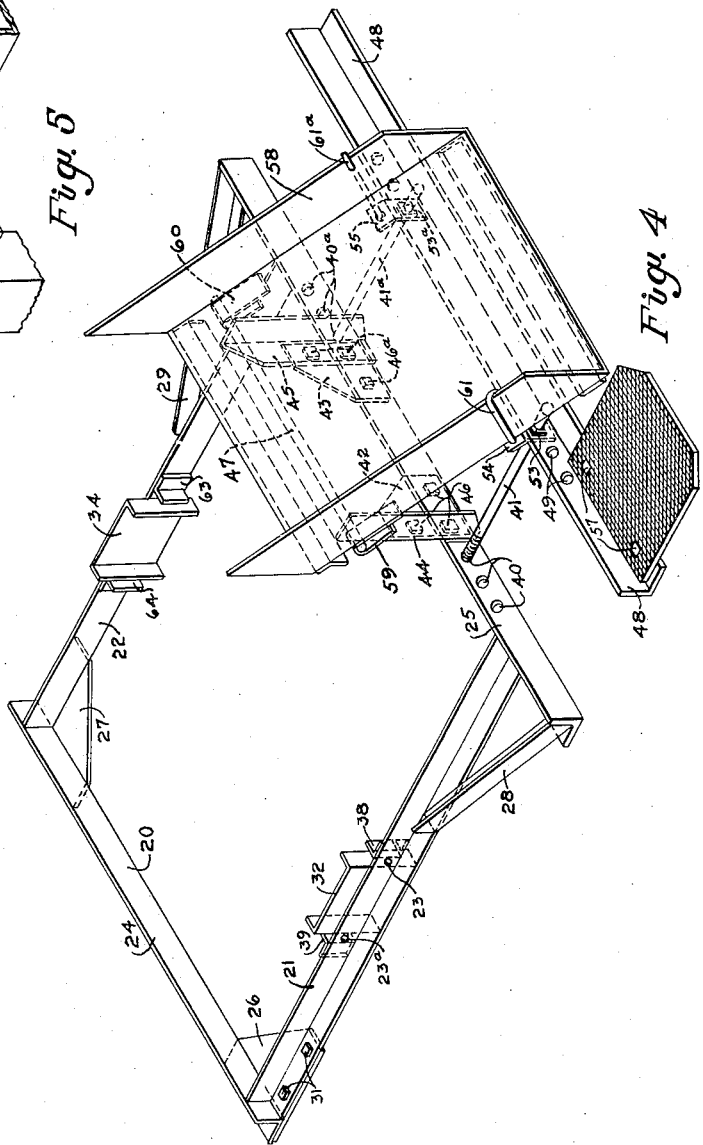
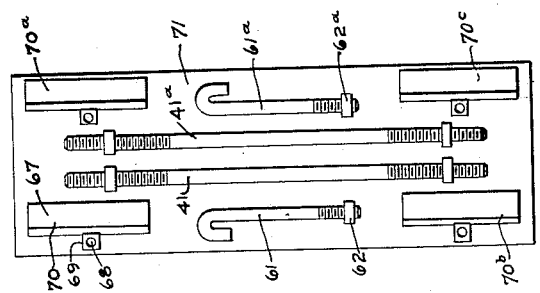
INVENTOR
SIDNEY LEVINSTIM
BY *Van Deventer + Grier*
ATTORNEYS Sept. 29, 1936.   S. LEVINSTIM   2,055,902

HOISTING APPARATUS

Filed Sept. 19, 1935   7 Sheets-Sheet 5

INVENTOR
SIDNEY LEVINSTIM

BY Van Deventer + Griet
ATTORNEYS

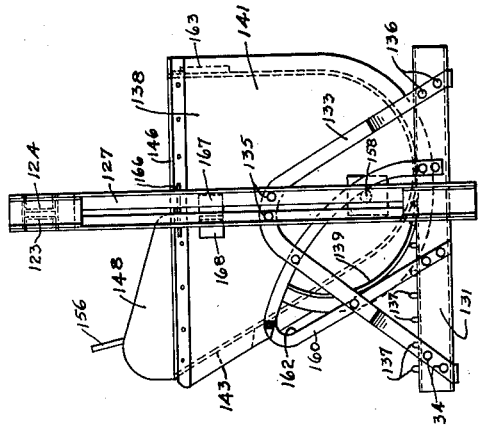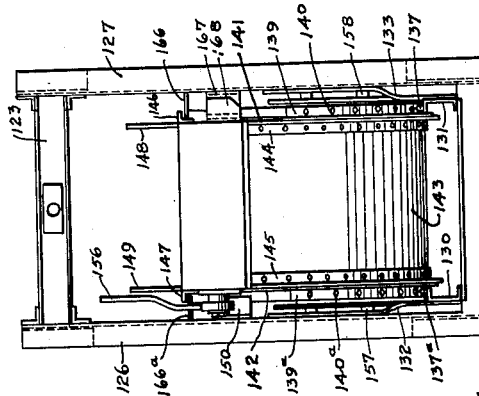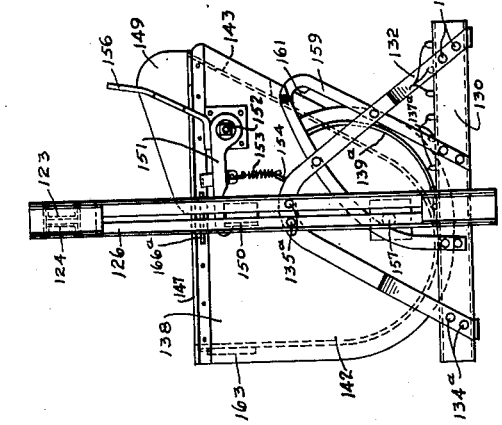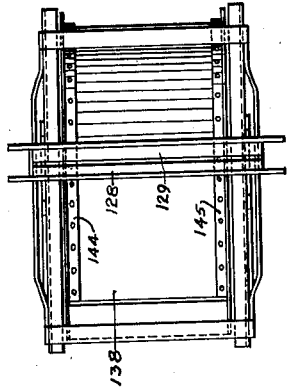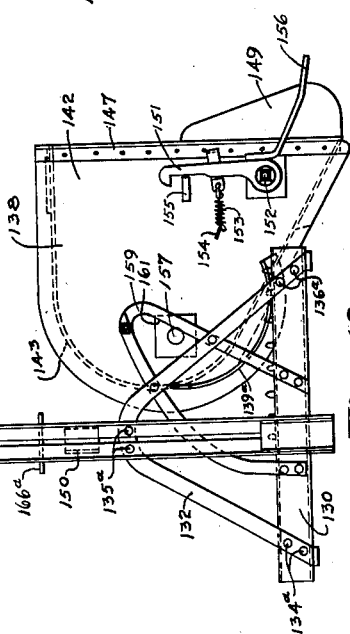

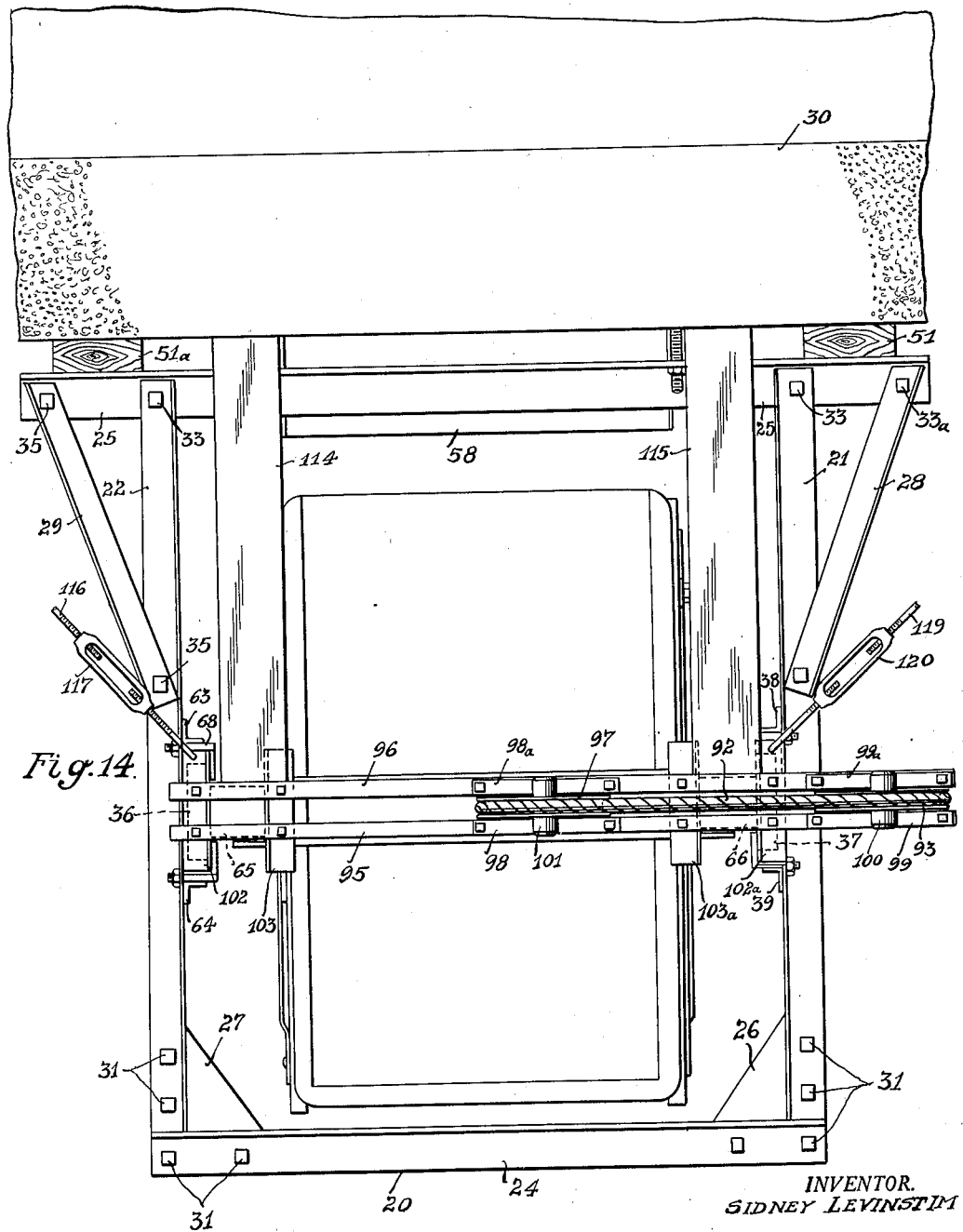

Patented Sept. 29, 1936

2,055,902

UNITED STATES PATENT OFFICE 2,055,902

HOISTING APPARATUS

Sidney Levinstim, New York, N. Y.

Application September 19, 1935, Serial No. 41,230

12 Claims. (Cl. 214—120)

This invention relates to improvements in hoisting apparatus for raising materials to different floors of a building under construction and has for a principal object the provision of a plurality of unitary frames each of which is adapted to be secured to the building, bridging a window or door opening and secured thereto by bolts or the like extending from the frame to an angle iron or the like, bridging the interior of said window or door.

Another object of the invention is the provision of a plurality of unitary frames having opposed channel members formed integral with the frames on opposite sides thereof and forming guides for rail members on which a hoisting carriage may travel, novel means being provided for securing the rail members to the unitary frames to form a rigid structure.

Still another object of the invention is the provision, in hoisting apparatus, of a plurality of unitary structures, each comprised of four sides forming a rectangular frame through which the carriage may pass, each frame being rigidly braced at the four corners thereof, one side being longer than the other sides and adapted to bridge an opening in the wall of a building, and in which a discharge chute support is formed integral with said longer side and so positioned thereon that a chute mounted thereon is in the proper position to discharge material when said frame is secured to a building, bridging an opening formed therein.

Another object of the invention is the provision in a hoist having external unitary frames, rails carried thereby, a carriage adapted to move along said rails, and a bucket having a dumping lever associated therewith, of internal bridging members each bolted to one of said frames and carrying a platform upon which a workman may stand to operate the dumping lever.

A further object of the invention is the provision in hoisting apparatus erected along a vertical line of window openings of a building under construction and including vertical rails along which a carriage may travel, of a cathead secured to the upper ends of said rails, distance rods extending in substantially a straight line from the rails to a solid portion of the wall, and guy ropes or wires extending from the upper ends of the rails or from the cathead, angularly, to engage the building at points spaced apart from said apparatus.

Another object of the invention is the provision in hoisting apparatus, of rails upon which a suitable carriage may travel, channel members arranged to back said rails; the channels being rigidly supported in fixed relation to each other by suitable frames secured to the building and angle iron clamping members, each having a bolting shank formed integral therewith; two backing strips, each of which cooperates with one of said channels to rigidly secure a rail to the latter.

A further object of the invention is the provision of a hoist which may be trucked or moved in unitary parts arranged to be readily and accurately bolted together for quick assembly or disassembly, at the same time providing a mechanically rigid structure. These units are the unitary frames (one for each floor) which member up against the outer face of the wall and carry positioning channel sections; assembly backing strip and guide rail sections; clamping angle iron pieces applied to the inside wall in cooperative relation with the frames; the assembly chutes (one for each floor); and the panel of clamps (one for each floor). In addition, each hoist includes the following single units; the cathead with the parts completely assembled; the foot board used at the bottom of the pit, the timber with shive assembly complete and ready to be mounted; and the bucket and carriage assembly.

Other objects and advantages of the invention will be apparent to those skilled in the art.

Referring to the drawings:

Figure 4 is a perspective view showing the relation of the unitary frame, its associated bridging clamp member, and the discharge chute;

Figure 5 is a fragmentary view of a portion of one side of the unitary frame, showing the method of securing the rail thereto;

Figure 6 is a plan view of a board forming a carrier for a set of bolts and clamps used at one window level, one set being provided for each floor of the building;

Figure 9 is a side elevation of one form of carriage used in the device, carrying a mortar bucket capable of being dumped;

Figure 10 is a front elevation of the carriage and bucket;

Figure 11 is a side elevation of the carriage and bucket from the side opposite to that shown in Figure 9;

Figure 12 is a bottom view of the carriage and bucket as viewed along the line 12—12 of Figure 10;

Figure 13 is a side elevation of the carriage and bucket similar to that shown in Figure 9, with the exception that the bucket is shown in a position to dump or discharge its contents; and Figure 14 is a plan view of the apparatus as viewed from above the cathead.

Figure 1:
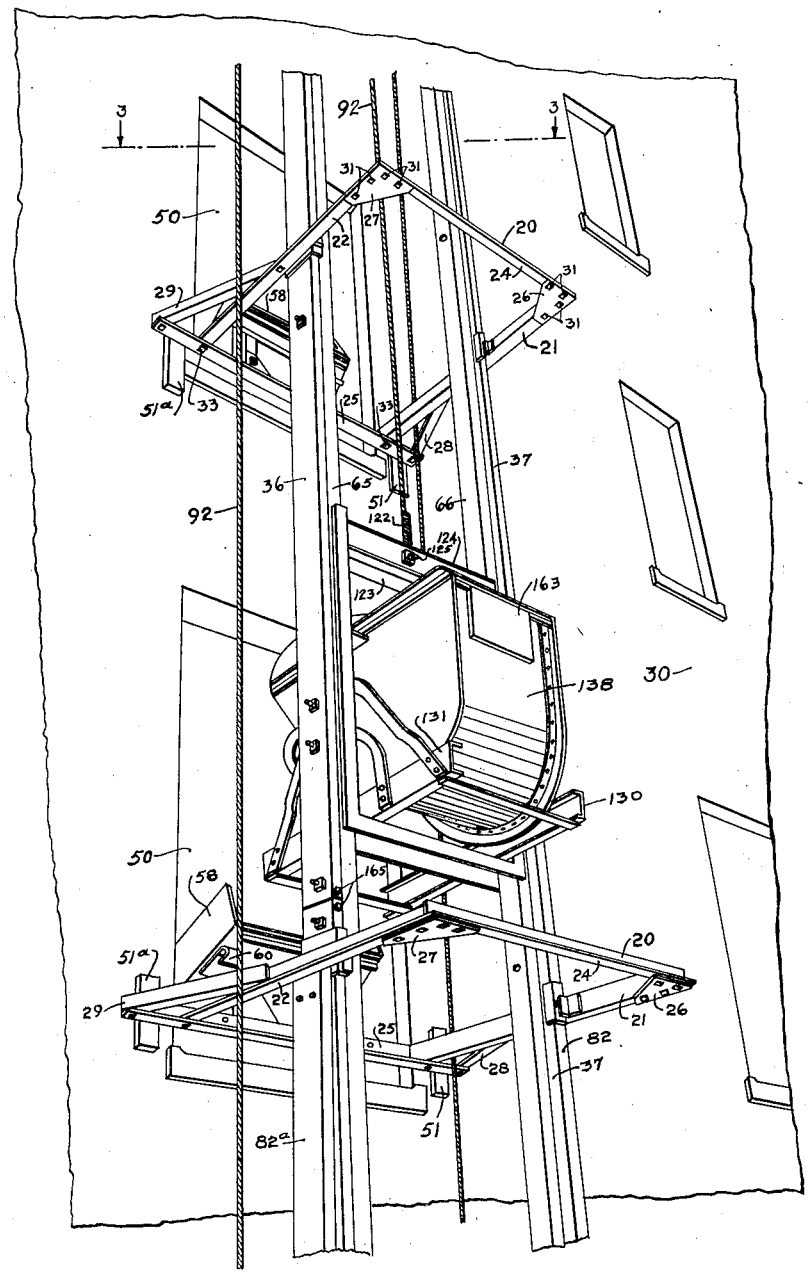
Figure 1 is a perspective view, partly broken away, showing the new and improved hoisting apparatus erected in operative relation to a building.
Figure 2:
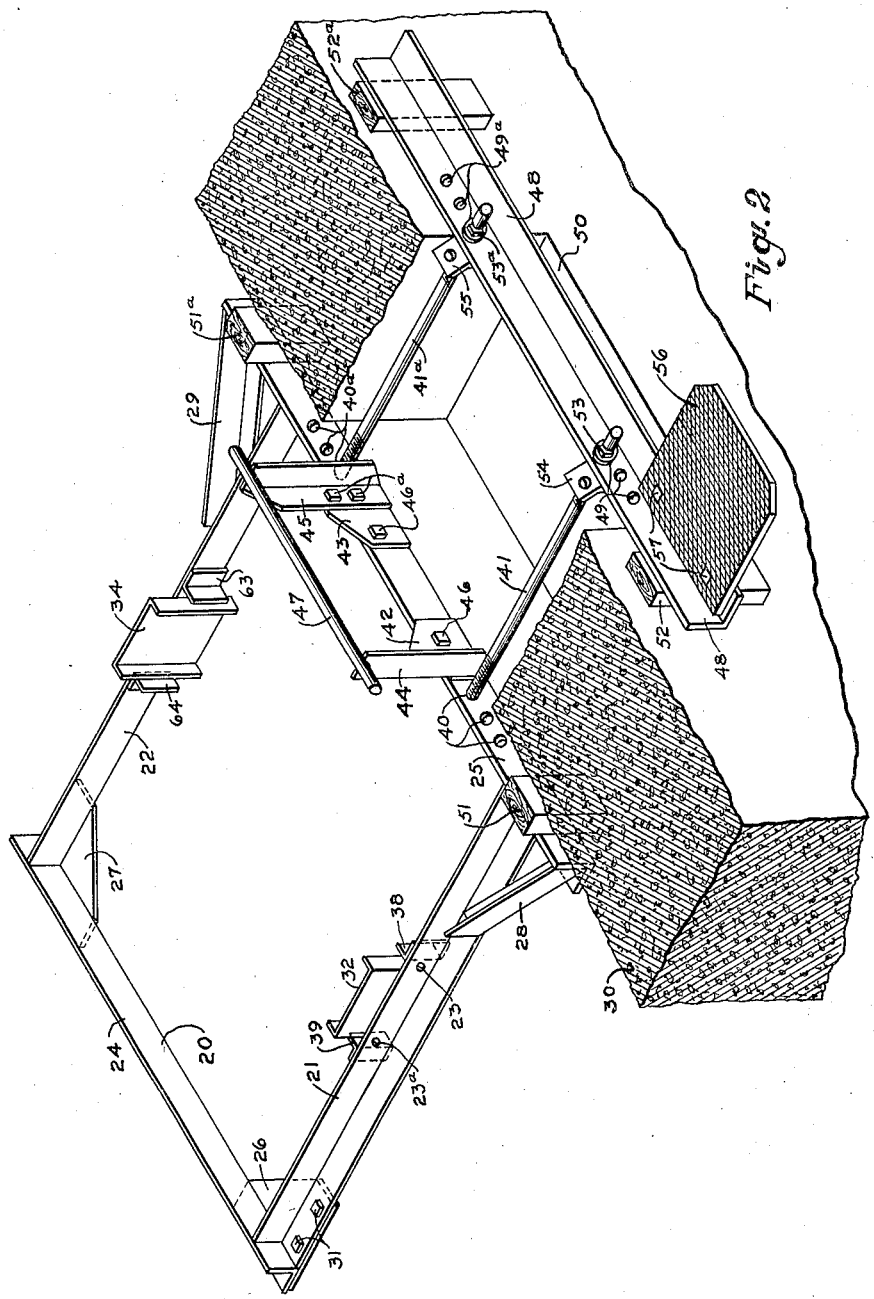
Figure 2 is a cross-sectional view of a portion of a building wall containing a window opening showing the manner in which the new and improved unitary frame members are rigidly secured to the building, spanning or bridging the window openings.

One of the main features of the device is the unitary frame structures, generally designated by the numeral 20, (Figures 1, 2, 3 and 4) consisting of side members 21 and 22, and end members 24 and 25.

A gusset plate 26 secures one end of the side member 21 to one end of the end member 24, and the other end of the member 24 is secured to the side member 22 by means of a gusset plate 27. The gusset plates may be permanently secured to the members in any suitable manner; for example, by bolts or rivets one pair of which are designated by the numeral 31.

The end member 25, which is provided to parallel the wall of the building 30, is substantially longer than the member 24, and extends beyond the side members 21 and 22. The ends of the latter are permanently secured to the member 25 by means of bolts or rivets 33, which are spaced apart from the ends of the member 25.

A bracing member 28 extends from a point near one end of the member 25 to a point near the mid-portion of the side member 21 and is secured to said members by bolts or rivets 33a, and a similar bracing member 29 is secured to the other end of the member 25 and to a point along the length of the side member 22 by means of bolts or rivets 35, thereby a rigid unitary structure is formed.

The vertical webs of the members 21, 22 and 24 form flat vertical faces in the interior of the frame, and the vertical web of the end member 25 faces outward so that when the frame is mounted this web may member up against the flat wall of the building, or against blocks or shims positioned therebetween.

The side member 21 has a short channel section 32 secured thereto, and the side member 22 has a like channel section 34 secured thereto. These channel sections are preferably welded to the flat vertical faces of the members 21 and 22 so that they are oppositely disposed in the frame and parallel to each other and are provided to form supporting guides for backing strips 36 and 37 respectively.

The side member 21 (see Figure 2) has clearance holes 23 formed therein, one on each side of the channel member, through which bolt shanks of clamping members to be described may pass.

An angle iron 38 is welded to the side member 21 with one web parallel to the channel member 32 and spaced apart therefrom, a clearance hole 23 being positioned between said web and the edge of the channel member. A second angle iron 39 is secured to the side member 21 in the same manner and in a like relation to the opposite edge of the channel member 32 with the second clearance hole 23a therebetween.

The side member 22 is also provided with short lengths of angle irons 63 ad 64, which are positioned relative to the channel member 34 in the same manner as the angle irons 38 and 39, are positioned relative to the channel member 32, holes 23 and 23a also being positioned between the angles 63, the channel member 34 and the angle 64, respectively.

The member 25 has a plurality of holes 40 and 40a formed therein through which tie bolts 41 and 41a may pass. The several holes are provided to take care of different widths of window openings.

The member 25 has secured thereto a gusset plate 42 and a gusset plate 43, which secure the up right angle irons 44 and 45 to the member 25 suitable bolts or rivets 46, 46a being provided for that purpose.

The upper ends of the angle irons 44 and 45 have welded or otherwise secured thereto a rod which is provided to form a support for a discharge chute which will presently be described. A length of angle iron 48 is provided with a plurality of holes 49 and 49a of substantially the same spacing as that of the holes 40 and 40a in the member 25. The unitary frame 20 is applied to the building bridging a window opening 50 in the wall 30, preferably membering up against shims 51 and 51a. An angle iron 48 is applied inside the building, also bridging a window opening 50, preferably with shims 52 and 52a between the angle iron and the wall.

Nuts 53 and 53a on the bolts 41 and 41a respectively are tightened, thereby firmly securing the unitary frame 20 against the wall of the building, bridging the window opening 50. The angle iron 48 has secured thereto, lugs 54 and 55 forming part of a means for securing the chute in operative relation to the elevator bucket which will presently be described.

A suitable platform 56 is secured to the member 48 by any suitable manner; for example, by means of bolts 57.

In erecting the new and improved device along side a building, one of the unitary frames 20 is secured to the building, bridging a window opening on each floor with all of the channel members 32 in line with each other, and all of the channel members 34 in line with each other.

Figure 1, which is a fragmentary elevation of one of the devices, shows a unitary frame member 20 secured to one window and another unitary frame member 20 secured to the window immediately above the first window. It is obvious that within certain limits, one of these frame members may be applied to each of a plurality of window levels provided they are in line with each other.

Figure 3:
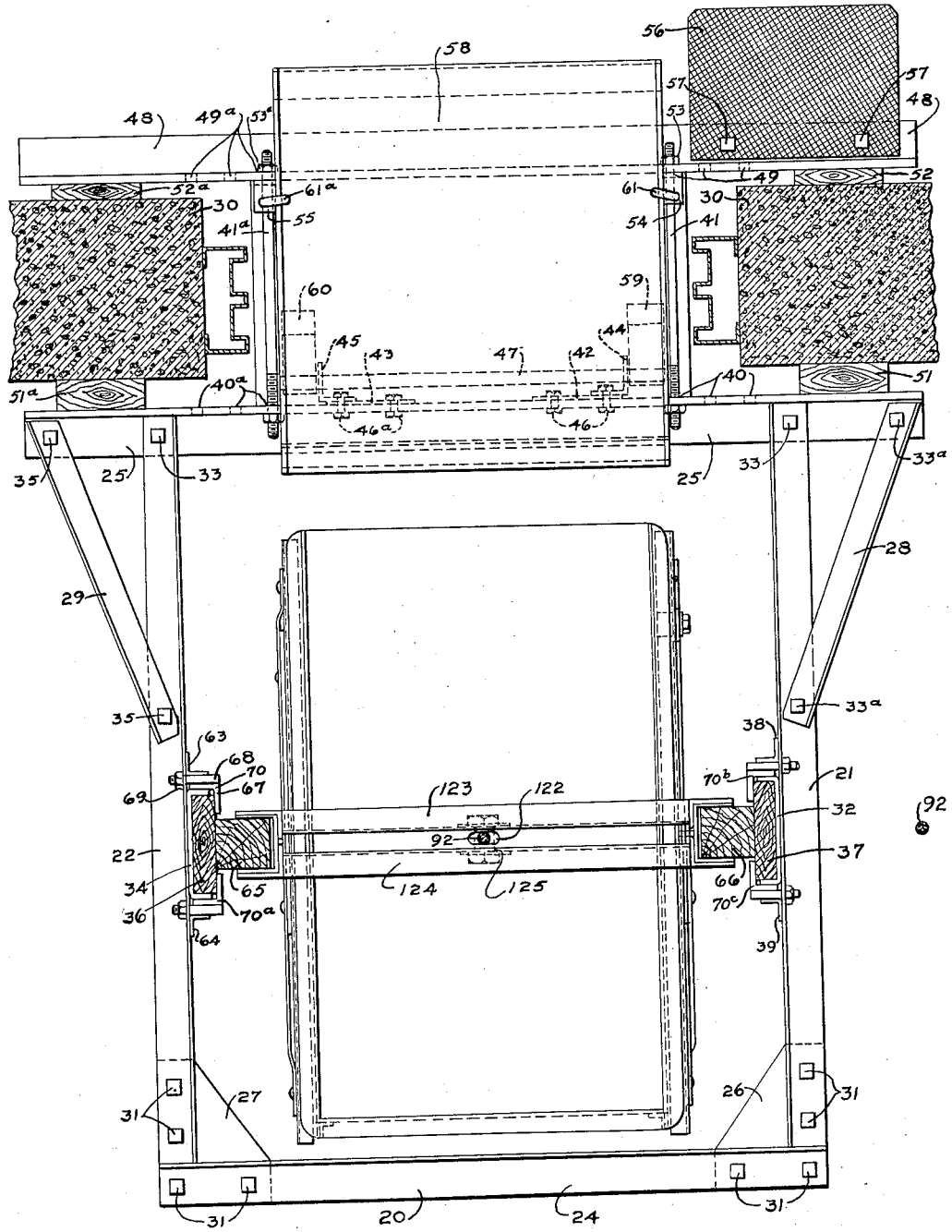
Figure 3 is a plan view partly in section of the device taken along the line 3—3 of Figure 1, showing the rails in position in the unitary frame, the carriage in operative position thereon, and the discharge chute in its normal position in the window opening.

A chute 58, having U-shaped members 59 and 60, preferably welded thereto, is positioned with the U-shaped members riding the rod 47 and membering up against the upright angle irons 44 and 45, Figures 3 and 4, thereby preventing lateral displacement of the chute in one direction. Hook bolts 61 and 61a engage the edges of the chute 58 and pass through holes in the lugs 54 and 55, after which the nuts 62 and 62a may be tightened, thereby securing the chute in fixed relation to the channel members 32 and 34, which determine the position of the rails, which will presently be described. These bolts prevent lateral displacement of the chute in the opposite lateral direction, as well as upwardly. When the chute is in this position, the lugs 54 and 55 are inclined so that the clamps 61, 61*a* may have straight shanks. These lugs constitute the support for the lower end of the chute.

The backing strip 36 may have any type of rail secured thereto, upon which the carriage may move but in the preferred embodiment, a square wooden rail 65 is shown, and a similar rail 66 is secured to the backing strip 37. The backing strip 36 is secured to the channel 34 as follows:

An angle iron 67 has a bolt shank 68 welded to the outside face of one web thereof, which web is positioned between the face of the channel 34 and the angle iron 63. The other web of the angle iron overlies a portion of the backing strip 36.

When a nut 69 is applied to the threaded shank 68 and tightened, the backing strip 36 is firmly clamped in position in the channel 34, see Figures 3 and 5.

The combined angle iron and bolt shank together with the nut 69 will hereinafter be termed a clamping member and will be generally designated by the numeral 70.

A second clamping member 70*a* engages the backing strip 36 on the opposite side of the channel 34 and when these two clamping members engage the backing strip the latter is firmly secured to the channel member. As the backing strip is clamped at each window level the whole structure is very rigid. The backing strip 37 is clamped to the channel 32 in the same manner by means of clamping members 70*b* and 70*c*.

Referring to Figure 6, it will be noted that a board 71 containing a complete set of assembly hardware is provided for each window level. This set consists of clamping members 70, 70*a*, 70*b*, 70*c*, bolts 41, 41*a* and hook bolts 61 and 61*a*.

The bottom of the hoist is arranged as follows:
A pit 72 is formed in the ground below and in line with the window openings. A piece of timber 73 is placed in the pit 72 in line with the channel sections 32 and 34. The backing strip 36 with its rail 65 and the backing strip 37, with its rail 66, bottom against the timber 73 and usually these backing strips are toenailed to the timber 73.

A piece of timber 74, similar in size and weight to the backing strip 37, also extends into the pit 72 and has its lower end resting on and secured to the timber 73.

An angle iron 75 has welded or otherwise secured thereto on one flat surface or web 77 thereof, a channel iron 76. The iron 75 is mounted with its web 77 resting on the upper end of the timber 74 which is secured to the backing strip 37 by means of angle irons, one of which is designated by the numeral 78. Bolts 79 pass through the angle irons 78 and the angle iron 75, and other bolts 80 pass through the angle iron 78 and through a strip 81.

A timber 82 is mounted parallel to the backing strip 37 with its lower end retained by the channel 76 and its upper end membering up with the bottom of the lowest unitary frame 20, immediately adjacent to the backing strip 37 (Figure 1).

In some cases, it may be preferable to provide a second timber 82*a* mounted in the same manner along the backing strip 36.

Figure 7:
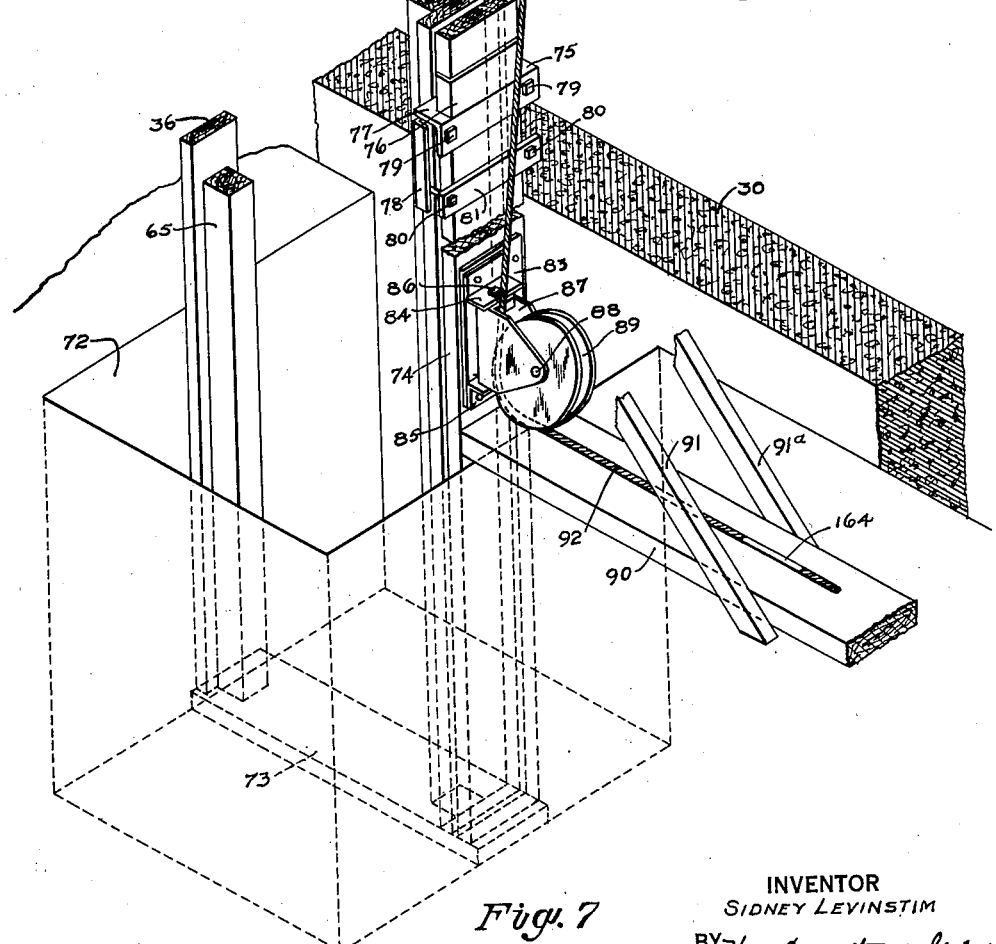
Figure 7 is a perspective view showing a preferred arrangement of the base of the new and improved apparatus.

A plate 83 (Figure 7) is provided with angles 84 and 85 oppositely disposed relative to each other with a vertical bolt 86 passing therethrough to form a swivel shaft. A U-shaped member 87 is provided with suitable bearings journalled on the bolt 86. This U-shaped member is provided with a shaft 88 forming a bearing for a grooved pulley 89.

A timber 90 has one end membering up against the timber 74 and its other end membering up against a suitable hoisting machine (not shown) which may be driven by gasoline, steam, or electricity. Suitable braces 91 and 91*a* may extend from the timber 90 to the timber 82 or 37.

Figure 8:
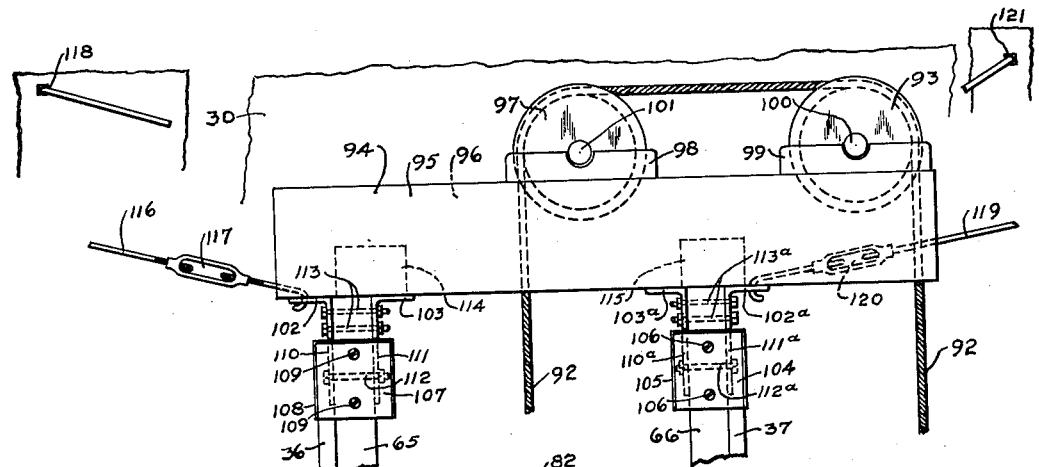
Figure 8 is a face elevation of the top of the new and improved apparatus showing the method of securing the "cathead" to the rails and the method of bracing and guying the same against vibration.

A suitable hoisting cable 92 extends from the hoisting machine, around the pulley 89 and up to a pulley 93 (Figure 8) forming a part of the cathead, generally designated by the numeral 94, and consisting of timbers 95 and 96 spaced apart from each other to form clearance for the pulleys 93 and 97.

Suitable bearings 98 and 99 carried by the timbers 95 and similar bearings 98*a* and 99*a* carried by the timber 96, form bearings for the shafts 100 and 101 of the pulleys 93 and 97, respectively. The timbers 95, 96 are secured to the upper ends of the rails 65, 66, by means of angle irons 102, 103, 102*a* and 103*a*.

A plurality of blocks, one of which is designated by the numeral 104, provided with metal edging 105, are secured to the rail 66 by means of bolts 106. Similar blocks 107, provided with metal edging 108, are secured by means of bolts 109 to the rail 65. The angles 102 and 103 member up with the metal edging of the blocks 107 and likewise, the angles 102*a* and 103*a* member up with the metal edging of the blocks 104.

The angle 102 has a tongue 110 welded thereto which extends between the blocks 107 on one side and the angle 103 has a similar tongue 111 which extends between the blocks on the other side of the rail 65.

A similar tongue 110*a* is secured to the angle 103*a* and the tongue 111*a* is secured to the angle 102*a*. Bolts 112 and 112*a* clamp the tongues to the rails and bolts 113 and 113*a* clamp the angle irons to the rails.

Timbers 114 and 115 extend from the wall of the building to the timber 96 and form distance rods to maintain the cathead a fixed distance from the building wall.

A guy 116 provided with a suitable turn buckle 117 has one end secured to the building at 118 and the other end secured to the angle iron 102. A similar guy 119 provided with a suitable turn buckle 120 has one end secured to the building at 121 and its other end secured to the angle iron 102*a*. These guys have two functions in that they secure the upper end of the hoist against side movement and at the same time clamp the upper end firmly against one end of the timbers 114 and 115. The other ends of these timbers rest against the wall. The cable 92, after passing over the pulley 93, passes over the pulley 97, which is so positioned that the cable may extend downwardly midway between the rails 65 and 66.

The cable has a suitable "eye" 122, which is secured to the carriage.

The upper end of the carriage (referring to Figure 3) is provided with two channel irons 123 and 124 having flat webs opposed and spaced apart, as shown in Figure 3. The eye 122 is positioned between the webs and is secured in this relation by means of a bolt 125. The carriage has upright sides 126 and 127 of channel form and adapted to slide on the rails 65 and 66 respectively.

These sides are preferably formed of angle irons suitably secured together to form a channel.

The sides 126 and 127 have their upper ends secured to the channel irons 123 and 124 (Figures 3 and 10) and have their lower ends connected together by means of angle irons 128 and 129 (Figure 12). Mounted on the angle irons 128 and 129, in transverse relation thereto, are channels 130 and 131. These channels are secured to the sides 126 and 127 respectively by means of offset members 132 and 133, which are curved in form. The member 133 is shown in Figure 11. It has one end secured to the left end of the channel by means of rivets 134. It extends upwardly and is secured to the angle irons forming the side 127 by means of bolts or rivets 135, and it extends to the right end of the channel 131 and is secured thereto by bolts or rivets 136. The upper surface of the channel 131 is provided with a plurality of studs 137 which are equally spaced apart.

A side of the offset member 132 is shown in Figure 9 and it is secured to the channel 130 by means of bolts or rivets 134a and 136a in a similar manner and is secured to the upright side of the carriage 126 by means of bolts 135a, thereby the channels 130 and 131 are positively pressed to the uprights 126 and 127.

The upper surface of the channel 130 is provided with a plurality of studs 137a which are also equally spaced apart and are preferably in line with the studs 137.

The bucket, generally designated by the numeral 138 (Figures 9 and 11), is provided with a curved extension 139 extending from one side thereof and a like curved extension 139a extending from the other side thereof. The extension 139 is provided with a plurality of holes 140 which are equally spaced apart in the same relation as the spacing of the studs 137. The extension 139a is provided with similar holes 140a which are spaced in the same manner.

When the bucket is in its normal position, as shown in Figures 9 and 11, some of the studs 137 engage the holes 140 and some of the studs 137a engage the holes 140a.

When the bucket is dumped the extensions 139 and 139a form rockers upon which the bucket rocks and in so rocking other studs 137 and 137a are engaged by other holes 140 and 140a respectively, thereby guiding the bucket in definite relation to the channels 130 and 131.

The bucket 138 consists of side members 141 and 142 with a bottom sheet 143 secured to the side members by suitable angle strips 144 and 145 which are welded to form a fluid tight vessel.

Suitable angle irons 146 and 147 are secured to the upper edges of the side members 141 and 142. The top edges of the side members 141, 142 are also provided with guide plates 148, 149. A member 150 is secured to the upright side 126 and is normally engaged by a hooked lever 151, which is pivoted on a stud 152 carried by the side 142, of the bucket 138.

A suitable spring 153 has one end secured to the lever 151 and the other end secured to a suitable support 154 on the bucket. A block 155, carried on the side of the bucket, is provided to limit the counter clockwise movement of the lever 151 as viewed in Figure 9. A hand lever 156 is secured to the lever 151 in any suitable manner, for example, by welding.

When the bucket is in its normal position, as shown in Figure 9, the hooked end of the lever 151 engages the member 150 and retains the bucket in its upright position.

A stud 157 is secured to the side 142 of the bucket and a like stud 158 is secured to the side 141. These studs, which constitute stops to limit the dumping movement of the bucket, are in line with each other and as the bucket is dumped, by operating the lever 156, it releases the hooked end of the lever 151 from the member 150, these studs travel along the inner surfaces of the guide members 159 and 160 respectively, the straight surfaces 161 and 162 being engaged by the studs 157, 158 respectively when the bucket is in the dumped position, as shown in Figure 13. A suitable plate 163 is welded on the bucket to balance the same.

When the bucket is in the dumped position with the carriage at the proper window level the guide plates 148 and 149 fall within the upright sides of the chute 58. If the carriage is lowered before the bucket has been restored to its upright position, due to the fact that the guide plates 148, 149 and the lip portion of the bucket therebetween, are engaged by the chute 58 and the downward movement will cause the bucket to rock to its upright position.

The upright side 127 has secured thereto a stop plate 167, and the side 141 of the bucket has secured thereto an angle member 168 which engages the stop plate 167 when the bucket reaches its normal upright position.

The upright sides 126 and 127 are provided with shield plates 166a and 166 respectively designed to shield the curved extensions 139, 139a and the studs 157 and 158 from becoming coated with mortar and the like.

In order to stop the carriage at the proper height at each window, it has been found that by marking the cable 92 by painting short sections thereof with white or any other color readily distinguished, the attendant can line these marks up with a stationary mark and thereby accurately position the carriage in the proper relation to any window level without the necessity of having to try back and forth several times.

One such mark is indicated on the cable 92 by the numeral 164.

Referring to Figure 1, it will be noted that the backing strips 36 and 37 are provided with cross bolts 165 to prevent the ends splitting or spreading.

From the above description it can be seen that the new and improved hoisting apparatus may be easily and rapidly erected along side a building. The frames 20 are secured in bridging relation to the window openings after which the rails and backing strips are assembled vertically and clamped into the channel members 32 and 34 which form integral parts of the unitary frame members 20, the pit 72 having been dug and the timber 73 positioned therein.

After the rails and backing strips have been clamped into position the timbers 95, 96, forming a part of the cathead, may be quickly secured to the upper ends of the rails. The guys 116 and 119 may be tightened to hold the cathead against the timbers 114 and 115 and the swivel pulley 89 secured to the lower end of the hoist as described, after which the carriage may be placed in position and the cable 92 may be strung over the pulleys 93 and 97, around the pulley 89 and its ends attached, one to the carriage and the other to the hoist. The device is then ready to operate.

It is found that such a structure, although it can be erected so rapidly, is very strong structurally and full buckets of material may be raised or lowered without any undesirable vibration of the structure.

The herein described device, due to the form of the bucket and the form and position of the chute, dumps the entire contents of the bucket at one level, thereby eliminating the necessity of dumping a portion of the contents of the bucket at one level and having to raise the bucket a little further in order to dump the balance of the contents.

Although a preferred embodiment of the new and improved device is herein shown and described, it is obvious that many changes may be made in the structure without departing from the spirit of the invention as defined in the following claims.

What is claimed is:

1. In hoisting apparatus to be applied to a wall of a building having openings formed along a vertical line therein, in combination, a plurality of unitary rectangular frame structures each having four sides, one side of each structure adapted to bridge one of said openings on the outside of said wall, a plurality of rigid members each adapted to bridge one of said openings on the inside of said wall, tie bolts securing each of said members to its associated frame structure, channel guide members oppositely disposed along a median line in said frame structures, vertical rails engaged by said guide members, means for securing said rails to said guide members, a carriage movable along said rails, and means for moving said carriage.

2. The invention according to claim 1 in which each of the rectangular frame structures, and their associated members are provided with a plurality of sets of holes, whereby said tie bolts may be positioned in the most convenient holes and in accordance with the width of the opening being bridged.

3. The invention according to claim 1 in which the side of the unitary frame structure engaging the outside of said wall carries upstanding supports having a rod secured thereto spaced apart from said side, a chute pivotally mounted on said rod and secured in fixed relation to the associated rigid member on the inside of said wall.

4. The invention according to claim 1 in which said carriage is provided with a bucket carrying a dumping lever, and in which each of said rigid members is provided with a platform upon which an operator may stand to operate said lever.

5. In hoisting apparatus a rail supporting and aligning device comprising, a unitary rectangular frame structure having one end adapted to bridge a window opening formed in the wall of a building, sides adjacent to said end each carrying oppositely disposed channel members substantially equidistant from said end, each adapted to engage a rail, another end of said structure parallel to said first end, corner braces rigidly securing said ends and sides together to form said structure, a rigid member adapted to be correspondingly positioned on the opposite side of said wall and also bridging said opening, means forming a plurality of aligned holes in said first end and in said rigid member, and a pair of tie bolts passing through those of said aligned holes adjacent to the sides of said opening.

6. In hoisting apparatus to be applied to a wall of a building under erection and having window openings formed therein along a vertical line, a plurality of unitary rectangular frames each having one end adapted to bridge or straddle one of said window openings on the outside of said wall, a plurality of rigid members each adapted to bridge one of said openings on the inside of said wall in opposed relation to a unitary frame structure, tie bolts securing each of said members to its associated frame structure, channel guide members oppositely disposed in said frame structures, vertical rails, backing strips secured to said rails and passing through said guide members, clamping members for securing said backing strips in fixed relation to said channel guide members, a carriage mounted on said rails, a cathead secured to the upper ends of said rails, distancing timbers between said cathead and said wall, guys extending from the vicinity of said cathead to points on said wall spaced apart from said cathead and including turn buckles which may be turned to make the guys taut, thereby holding the cathead tightly against said distancing timbers and bracing the same against side sway, a swiveled pulley having a support near the lower end of one of said rails, a cable having one end attached to said carriage and passing over pulleys in said cathead and said swiveled pulley, hoisting means secured to the other end of said cable for moving said carriage along said rails, and a distancing timber positioned between the support of said swiveled pulley and said hoisting means.

7. Hoisting apparatus according to claim 6 with the additional provision of a pit formed below the ground line and beneath the lower window, a timber transversely positioned in said pit and forming a support for the lower ends of said rails and backing strips, whereby when said carriage is positioned in said pit at the lower end of its travel it may be conveniently loaded from the ground level.

8. Hoisting apparatus according to claim 6 with the additional provision of a pit formed below the ground line and beneath the lower window, a timber transversely positioned in said pit, means securing the lower ends of said rails and backing strips to said timber, and other strips of timber positioned between said first timber and the lowest of said unitary structures substantially parallel to said backing strips, one of said last timber strips forming a support for said swiveled pulley.

9. Hoisting apparatus including a plurality of rigid unitary rectangular frame members adapted to be secured in alignment with each other and in fixed relation to a wall of a building, short vertically extending channels constituting positioning members secured to opposite sides of said frames along a median line therein, rails engaged by said positioning members and held in alignment a fixed distance from said wall, and means including clamping devices over-riding the sides of said channels for securing said rails to said frame members.

10. Hoisting apparatus including a plurality of frames in the form of rectangles adapted to be secured to the wall of a building each bridging one of a vertical row of window openings formed in said wall, a pair of short vertically extending channel members for each frame, oppositely disposed within and secured to said frame, angle irons secured to said frames adjacent to said channel members, rails aligned by said members, and clamping members held rigidly to said frames between said channels and said angle irons and each having a portion engaging a rail for rigidly securing the latter to said frames.

11. Hoisting apparatus according to claim 10 in which a carriage and bucket assembly is provided, and means is provided for moving said carriage along said rails, said assembly being adapted to pass through said frames during its movement.

12. Hoisting apparatus according to claim 5 in which any of the aligned holes may be used, in accordance with the width of the window opening, and in which a discharge chute is conjointly supported by said first end and by said member and held against lateral or vertical movement.

SIDNEY LEVINSTIM.